(No Model.)

H. PAULSON.
POST HOLE DIGGER.

No. 509,487. Patented Nov. 28, 1893.

Witnesses
John Inivie
Chas. S. Hyer.

Inventor
Hans Paulson
By John Wedderburn
his Attorney

UNITED STATES PATENT OFFICE.

HANS PAULSON, OF SUMNER, WASHINGTON.

POST-HOLE DIGGER.

SPECIFICATION forming part of Letters Patent No. 509,487, dated November 28, 1893.

Application filed July 26, 1893. Serial No. 481,507. (No model.)

*To all whom it may concern:*

Be it known that I, HANS PAULSON, a citizen of the United States, residing at Sumner, in the county of Pierce and State of Washington, have invented certain new and useul Improvements in Post-Hole Diggers; and I do hereby declare the following to be a full, clear, and exact description of the invention, such as will enable others skilled in the art to which it appertains to make and use the same.

This invention relates to post hole diggers, and has for its object to provide simple and convenient means for forming the post hole and at the same time removing the earth as it becomes loosened and thereby facilitate operation.

With these and other objects in view, the invention consists of the construction and arrangement of the several parts which will be more fully hereinafter described and claimed.

Figure 1:
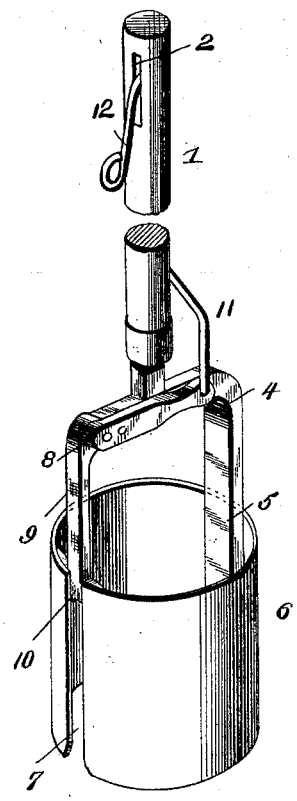
Figure 2:
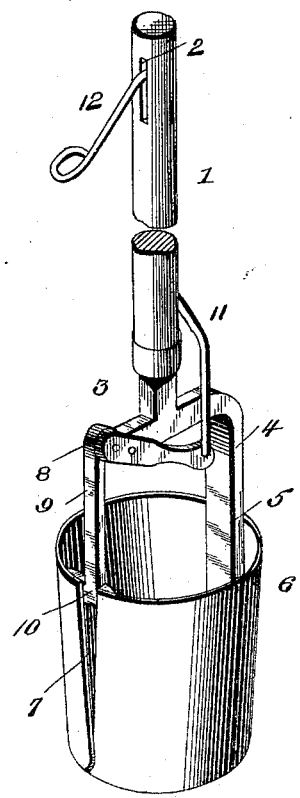

In the drawings:—Figure 1 is a perspective view of the improved device in its normal position. Fig. 2 is a similar view of the device arranged for lifting the earth from the post hole, and shown contracted at its lower portion.

Similar numerals of reference are employed to indicate corresponding parts in both figures.

Referring to the drawings, the numeral 1, designates an operating handle having a slot 2, extending through the upper part thereof. In the lower end of the handle 1, is fitted a tang 3, having an L-shaped arm 4, integrally formed therewith with its longest member 5, depending and securely fastened or riveted against the inner surface of a cylindrical cutter 6, which is open at one side as at 7, and has the lower edge sharpened sufficient to cause an easy penetration into the ground. Pivotally secured to the end of the shorter member of the L-shaped arm is a lever 8, which has its end projected beyond the said shorter member, and is pivotally attached to one side of the connecting bar 9, whose lower end is formed with lateral extensions 10, which are riveted or otherwise secured to the adjacent opposite portions of the cylindrical cutter 6, and by this means the said lower end of the connecting bar is caused to span the opening 7, of the said cylinder. To the inner end of the lever 8, is attached the lower end of a rod 11, the upper end of the latter being secured to one end of an operating lever 12, which is pivotally mounted in the slot 2, of the handle 1.

In operating the digger, it is driven into the ground by grasping the handle and holding it in an upright position in the position shown by Fig. 1. By this means the earth is loosened, and when it is desired to lift a quantity of the earth from the hole being dug, the operating lever 12, is drawn upwardly as shown in Fig. 2, thereby forcing the inner end of the lever 8, downwardly, and the outer end of said lever upwardly which pulls the connecting bar upward in a vertical direction, and contracts the lower end of the cylinder by drawing upward on that part of the cylinder to which the lateral extensions 10, are secured. By this operation, it will be seen that the earth contained within the cylinder is contracted or rendered in compact form at the lower end of said cylinder, and thereby retained in the latter. Of course when the cylinder is removed from the hole and the operating lever 12, released, the earth is loosened and allowed to fall from the said cylinder.

The device entire is exceptionally simple and requires but very little labor in operating the same.

The cylindrical cutter 6, is made of spring metal, and normally tends to assume the form shown in Fig. 1, and by this construction the use of hinged sections is avoided and a positively acting mechanism is provided.

Having thus described the invention, what is claimed as new is—

The combination of a cylindrical cutter with an opening extending through one side thereof in a vertical direction, an L-shaped arm, having the longest member thereof secured to the inner side of one portion of said cylinder, a connecting bar on the other end of said arm, having a lower lateral extension secured to the upper portion of the cylinder on opposite sides of the opening therein, a lever pivotally connected to the upper portion of the said connecting bar, a handle and an operating rod secured to said lever and said handle, substantially as described.

In testimony whereof I have signed this specification in the presence of two subscribing witnesses.

HANS PAULSON.

Witnesses:
  IRA WOLFE,
  W. L. THOMPSON.